(12) United States Patent
Walsh

(10) Patent No.: US 10,340,768 B2
(45) Date of Patent: Jul. 2, 2019

(54) FLYWHEEL ENERGY STORAGE DEVICE WITH INDUCTION TORQUE TRANSFER

(71) Applicant: Raymond James Walsh, Dallas, TX (US)

(72) Inventor: Raymond James Walsh, Dallas, TX (US)

( * ) Notice: Subject to any disclaimer, the term of this patent is extended or adjusted under 35 U.S.C. 154(b) by 0 days.

(21) Appl. No.: 15/878,236

(22) Filed: Jan. 23, 2018

(65) Prior Publication Data
US 2018/0166946 A1    Jun. 14, 2018

Related U.S. Application Data

(63) Continuation-in-part of application No. 14/523,687, filed on Oct. 24, 2014, now Pat. No. 10,125,814, and (Continued)

(51) Int. Cl.
*H02K 7/02* (2006.01)
*H02K 7/09* (2006.01)
(Continued)

(52) U.S. Cl.
CPC .............. *H02K 7/025* (2013.01); *H02K 7/09* (2013.01); *F03G 3/08* (2013.01); *F04D 13/06* (2013.01);
(Continued)

(58) Field of Classification Search
CPC ............ H02K 7/08; H02K 7/083; H02K 7/09; H02K 1/02; H02K 1/12; H02K 1/17; H02K 1/22; H02K 1/223; H02K 1/27; H02K 1/276; H02K 1/278; H02K 1/2786; H02K 11/00; H02K 11/04; H02K 11/048; H02K 23/04; H02K 23/30; H02K 23/40;
(Continued)

(56) References Cited

U.S. PATENT DOCUMENTS 5,107,238 A * 4/1992 Leupold .............. H01J 23/0873
                                                    315/5.35
6,111,332 A * 8/2000 Post ..................... F16C 32/0412
                                                    310/156.43
(Continued)

*Primary Examiner* — Tran N Nguyen
(74) *Attorney, Agent, or Firm* — Scott D. Swanson; Shaver & Swanson, LLP

(57) ABSTRACT

A flywheel energy storage device includes the Halbach Motor/Generator with rolling biphasic coil control, continuously variable torque transfer via magnetic induction and a reluctance magnetic levitation system known as the Axial-Loading Magnetic Reluctance Device. Electric energy input turns the magnetically coupled rotors of the Halbach motor, and torque is transferred to a flywheel through a copper cylinder variably inserted between the Halbach magnet rotors. In idle mode, the energy is stored kinetically in the spinning flywheel, which is levitated by a permanent magnet bearing. Electric energy output is achieved by transferring torque from the flywheel through the copper cylinder to the rotors of the Halbach Generator by magnetic induction. Rolling biphasic motor control includes dividing Halbach motor coils into increments, then energizing groups of contiguous increments into virtual coils, which revolve in tandem with the magnet rotors so to achieve continuous and optimal torque.

22 Claims, 7 Drawing Sheets

Related U.S. Application Data a continuation-in-part of application No. 14/185,910, filed on Feb. 20, 2014, now Pat. No. 9,876,407.

(60) Provisional application No. 61/895,115, filed on Oct. 24, 2013, provisional application No. 61/766,705, filed on Feb. 20, 2013, provisional application No. 61/891,829, filed on Oct. 16, 2013, provisional application No. 61/892,019, filed on Oct. 17, 2013, provisional application No. 61/894,489, filed on Oct. 23, 2013, provisional application No. 61/895,115, filed on Oct. 24, 2013, provisional application No. 61/899,204, filed on Nov. 2, 2013, provisional application No. 61/906,136, filed on Nov. 19, 2013, provisional application No. 61/906,703, filed on Nov. 20, 2013, provisional application No. 62/596,376, filed on Dec. 8, 2017.

(51) Int. Cl.
*F03G 3/08* (2006.01)
*F04D 13/06* (2006.01)
*F16C 32/04* (2006.01)
*F04D 25/06* (2006.01)

(52) U.S. Cl.
CPC .......... *F04D 25/06* (2013.01); *F05D 2260/43* (2013.01); *F16C 32/0417* (2013.01); *F16C 2361/55* (2013.01); *Y02E 60/16* (2013.01)

(58) Field of Classification Search
CPC ........ H02K 16/00; H02K 16/02; H02K 21/02; H02K 21/029; H02K 21/12; H02K 21/14; H02K 21/20; H02K 21/22; H02K 21/225; H02K 21/46; H02K 29/00; H02K 29/03; F16C 25/04; F16C 25/045; F16C 32/04; F16C 32/0408; F16C 32/041; F16C 32/0412; F16C 32/042; F16C 32/0425; F16C 32/043; F16C 32/0436; F16C 32/044; F16C 32/0448
See application file for complete search history.

(56) References Cited

U.S. PATENT DOCUMENTS

| | | | |
|---|---|---|---|
| 6,710,492 B2* | 3/2004 | Minagawa | H02K 16/02 310/113 |
| 8,253,299 B1* | 8/2012 | Rittenhouse | B62M 6/90 310/257 |
| 9,755,463 B2* | 9/2017 | Klassen | H02K 1/20 |
| 2016/0094096 A1* | 3/2016 | Hunstable | H02K 23/04 310/154.28 |

* cited by examiner

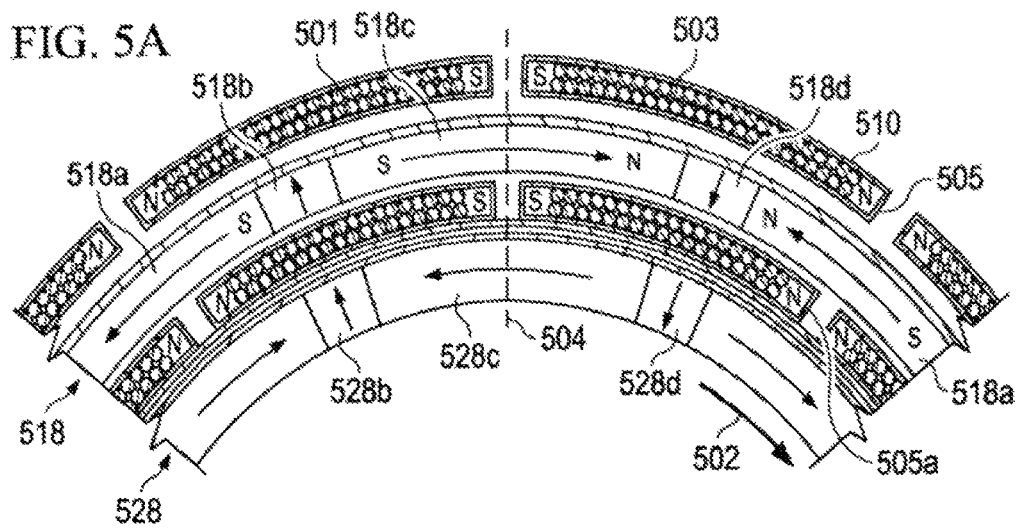
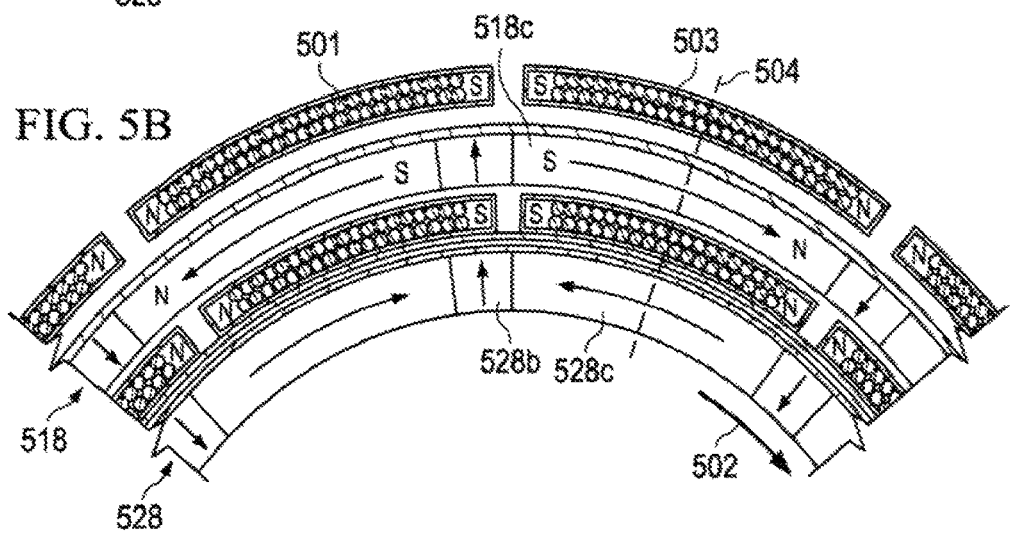
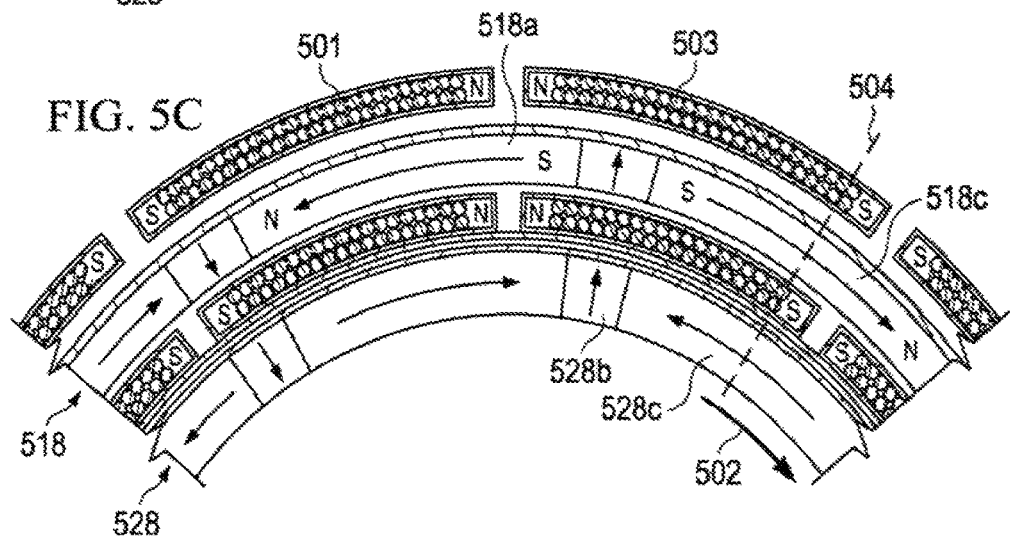

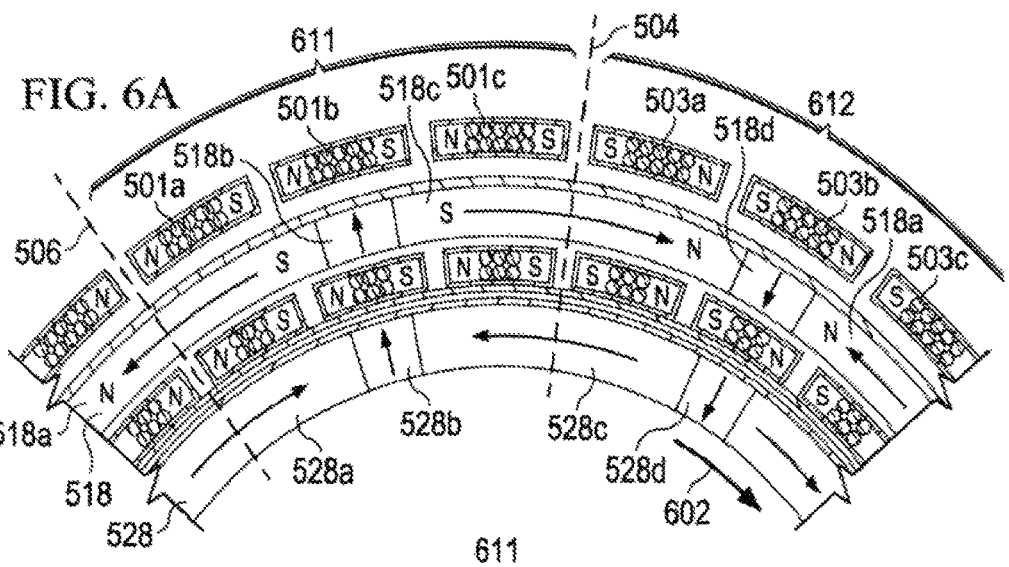
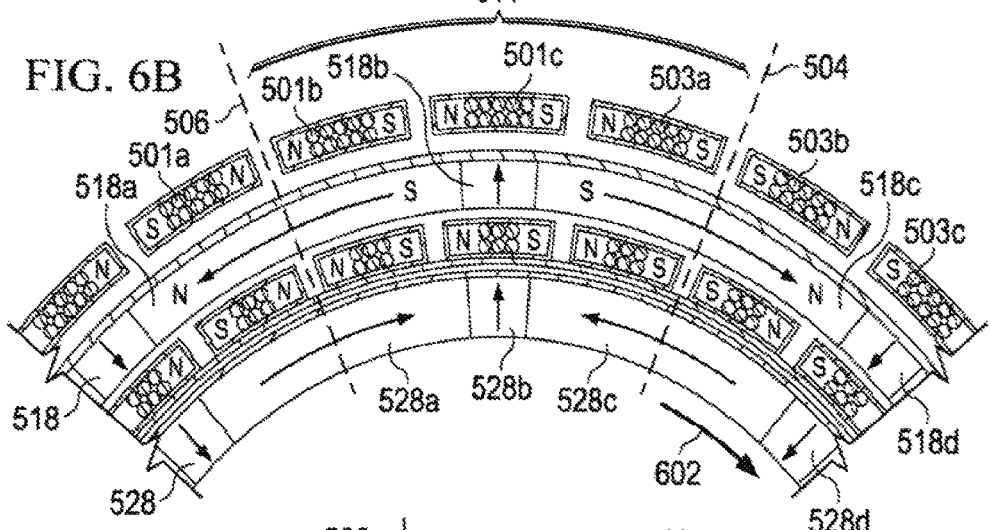
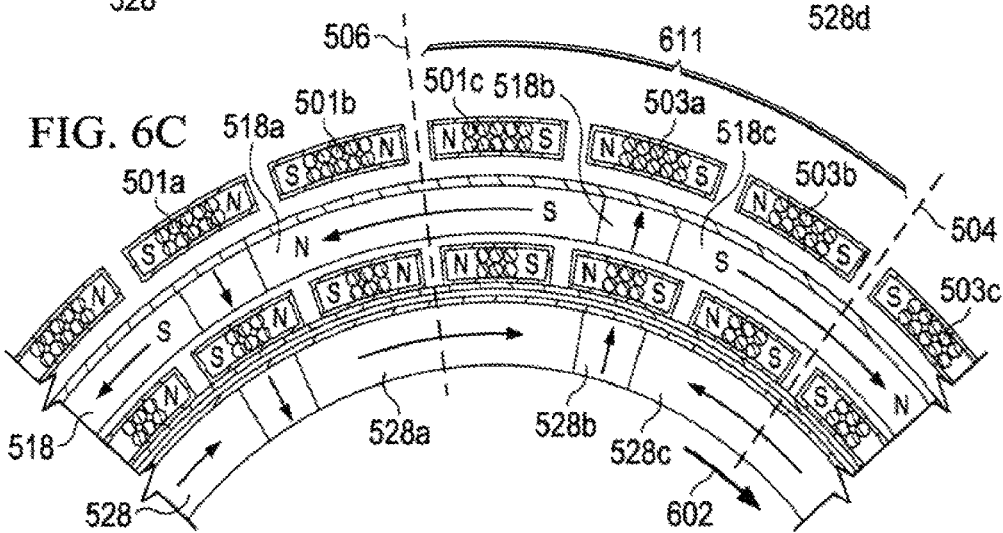

FLYWHEEL ENERGY STORAGE DEVICE WITH INDUCTION TORQUE TRANSFER

CROSS-REFERENCE TO RELATED APPLICATIONS

This application is a continuation-in-part of co-pending patent application Ser. No. 14/185,910 filed on Feb. 20, 2014, which issues as U.S. Pat. No. 9,876,407 on Jan. 23, 2018, and claims the benefit of:
U.S. Provisional Application No. 61/766,705 filed Feb. 20, 2013,
U.S. Provisional Application No. 61/891,829, filed Oct. 16, 2013,
U.S. Provisional Application No. 61/892,019, filed Oct. 17, 2013,
U.S. Provisional Application No. 61/894,489, filed Oct. 23, 2013,
U.S. Provisional Application No. 61/895,115, filed Oct. 24, 2013,
U.S. Provisional Application No. 61/899,204, filed Nov. 2, 2013,
U.S. Provisional Application No. 61/906,136, filed Nov. 19, 2013, and
U.S. Provisional Application No. 61/906,703, filed Nov. 20, 2013, and this application is also a continuation-in-part of U.S. patent application Ser. No. 14/523,687, filed Oct. 24, 2014, and published Apr. 30, 2015, as U.S. Pat. Pub. No. US 2015-0115756 A1, which claims the benefit of U.S. Provisional Appl. No. 61/895,115, filed Oct. 24, 2013, and this application still further claims the benefit of U.S. Provisional Application No. 62/596,376, filed Dec. 8, 2017, which patent and all of which applications are hereby incorporated herein by reference, in their entireties.

BACKGROUND

Flywheel energy storage (FES) provides a renewable way to store energy. Energy from a source such as wind or solar may be stored in a spinning flywheel. This kinetic energy may be used during the periods when the sun isn't shining or the wind isn't blowing. An array of FES units may also supplement the power grid by storing energy at night when demand is low, then augmenting the grid during peak demand.

The kinetic energy stored in an FES is typically harvested using a dynamo, which converts the stored kinetic energy into electricity. The flywheel will slow down as kinetic energy is extracted, and then replenished energy when external energy becomes available. The cycle continues in renewable fashion.

Friction is the greatest impediment to the efficacy of FES. A flywheel spun up to speed will slow down over time as friction slowly bleeds kinetic energy from the system. The bearings that support the flywheel are the main source of friction. To a lesser extent, friction from air resistance will slow the flywheel, but this is easily overcome by placing the flywheel in a vacuum. Because friction within the bearings is a function of force, most FES systems support the axial weight of the flywheel magnetically. A typical configuration uses permanent magnets balanced with electromagnets. Electromagnets require power, however, and are not an optimal solution. Radial forces are typically stabilized with mechanical centering bearings. Ceramic bearings are popular for this purpose as they are more durable, lighter in weight, and do not require lubrication.

The amount of energy stored in a flywheel depends on the mass, velocity, and shape of the flywheel. The simple formula for kinetic energy is $E=\frac{1}{2}mv^2$, so doubling the mass doubles the kinetic energy, but doubling the velocity quadruples the kinetic energy. For this reason, commercially available FES devices spin at tens of thousands of rotations per minute. These high angular velocities can be dangerous so flywheels are generally placed within a reinforced container, and the flywheels are made of composite materials that can withstand high force. Shape also plays a role, and more energy is stored when the mass of the flywheel is distributed farthest from the axis of rotation. For this reason, the ideal flywheel is barrel-shaped and open in the center rather than the same mass distributed in the shape of a solid cylinder.

Conventional rotary coil motors are well-known and have been in existence for well over a century, the basic design feature being a rotor ring with ferromagnetic elements passing through a series of stator coils arranged in a circle or toroid. Various methods for transfer of torque have been employed, most commonly using a system of gears, chains, or pulleys. These devices, however, have not enjoyed widespread use.

Subsequent designs and improvements sought to transfer torque by magnetically coupling across a magnetically permeable sealed housing. This advance enabled the movement of fluids without contact between the fluids and vulnerable elements within the motor. Examples include a machine for moving wet cement, another for moving coolant within a nuclear reactor, and a centrifugal pump design.

More recent art replaces the ferromagnetic elements (iron elements which are not magnetic, but which respond to magnetic forces) within the rotor with permanent magnets. Whereas a ferromagnetic element can only be attracted into a coil, a permanent magnet can be simultaneously repelled out of one coil and attracted into an adjacent coil, provided that current through one coil is in the opposite direction relative to the other. U.S. Pat. No. 6,252,317 to Scheffer et al. discloses a commutated electric motor with a plurality of permanent magnets on a rotor that passes through coil stators. This typical permanent magnet/coil motor incorporates a rotor ring comprising a series of magnets arranged in alternating magnetic polarity with spaces or non-magnetic elements between the magnets. The magnetic rotor passes through an interrupted series of coils, the interruptions between the coils being necessary for mechanical transfer of power between the rotor and the powertrain. In this device, torque is transferred by means of teeth on the rotor engaging multiple gear wheels.

While conventional coil motors employ permanent magnet rotors and mechanical means to transfer torque, there are inherent inefficiencies and deficiencies in such coil motor designs and means of transfer torque. The most notable among these is the difficulty in transferring mechanical power from a rotor travelling within a set of coils, typically accomplished by means of gears or pulleys making physical contact with the rotor through spaces between the coils. But allowing these spaces limits the number of coils, and hence, the power density of the motor, and introduces an element of friction. Secondly, these devices harvest only the magnetic field within the coils whereas considerable magnetic field is also available outside the coils to perform meaningful work when configured appropriately.

Generators, which could be described as the converse of electric motors, also suffer from similar inherent inefficiencies and deficiencies. For example, U.S. Pat. Pub. 2012/0235528A1 to Axford teaches a toroidal inductance generator employing magnets within a toroidal copper coil being induced to move by magnetically coupled magnets external to the coil attached to an internal combustion motor. Design limitations, however, preclude this generator from also functioning as a motor.

A clutch is a mechanical device for the purpose of rotory power transmission from one drive shaft to another. The driving member is the shaft attached to an engine while the driven member is the shaft that provides rotary power for work. When fully engaged or locked, the driving member and driven member rotate at the same speed. Slippage occurs when the driving member does not fully engage, resulting in the driven member rotating at a slower speed than the drive member. A brief period of slippage allows for the smooth transition between engagement and disengagement. In the case of the friction clutch, slippage quickly generates unwanted heat, which over time can warp clutch surfaces.

When it becomes desirable that the drive member and driven member rotate at different speeds for any length of time, a transmission is employed. This transmission may be accomplished by various means, including a gear box, a torque converter fluid coupling, or a continuously variable system employing a belt drive with expanding pulleys. A transmission is typically coupled to a clutch which may engage or disengage the transmission from the engine.

Bearings are a major source of friction and heat within a motor. A bearing is a machine element that both reduces friction and constrains motion between moving parts. Many types of bearings exist, but the greatest reduction in friction occurs when a magnetic bearing is employed, which supports a load using magnetic levitation. Magnetic bearings permit relative motion with very low friction and mechanical wear, and thus support the highest speeds of all kinds of bearing.

Typical magnetic bearings employ both permanent magnets, which do not require input of power, and electromagnets which provide external stabilization due to the limitations described by Earnshaw's Theorem. An electronic controller receives input from a position sensor, and energizes the electromagnet so as to maintain a predetermined position between the supporting permanent magnets. Electromagnetic attraction or repulsion and electronic positional feedback ar central to balancing permanent magnet forces in order to achieve friction-free magnetic levitation. An obvious limitation is the requirement of external power for the electromagnets.

Magnetic bearings employing magnetic reluctance do not require external power. Review of the prior art, however, indicates that magnetic reluctance bearings have not enjoyed widespread use. Magnetic reluctance comes into play whenever a group of magnets and ferromagnetic elements are arranged in a circle, allowing completion of a magnetic circuit. Reluctance is said to be at a minimum when a magnetic circuit employs materials with the greatest permeability and when the path of the magnetic flux completes the magnetic circuit by the most direct route possible.

The magnetic permeability of a material is a measure of its ability to allow the passage of magnetic flux. It is analogous to conductivity in electricity. Iron, for instance, has a high magnetic permeability whereas air has low magnetic permeability. Magnetic flux will still pass through air, just as an electric spark will cross an air gap, but flux passes much more readily through iron.

Reducing air gaps between the magnets and/or ferromagnetic components minimizes reluctance. Conversely, reluctance increases whenever a magnetic circuit is disrupted by an increased air gap between the magnetic materials comprising the circuit. Air, having relatively low magnetic permeability, resists the flow of magnetic flux. Directing or focusing the path of flux between the magnetic elements by use of magnet arrays such as the Halbach series facilitates completion of a magnetic circuit and also minimizes reluctance.

Magnetic reluctance has different and advantageous physical and mathematical properties in comparison to the typical magnetic forces of magnetic attraction and repulsion. Whereas the force between magnets falls off with the inverse of the square of the distance between the magnets, reluctance forces increase in a linear fashion with displacement. For example, when two Halbach series are magnetically coupled across an air gap of distance X, the force between the arrays is only ¼ as strong at a gap distance of 2X. Experimentation has shown that when two arrays are made to slide past each other at a constant gap distance X, like railway cars on parallel tracks moving in opposite directions, reluctance forces will increase in linear fashion over a short displacement, achieve a maximum, then fall to zero in linear fashion. By way of reference, both a rubber band and a steel spring demonstrate linear force-displacement characteristics. Pulling on either is initially easy but becomes harder the more the rubber band or spring is stretched up to the point of failure.

Flywheel energy storage (FES) provides a renewable way to store energy. Many such devices have been described. Energy from a source such as wind or solar may be stored in a spinning flywheel. This kinetic energy may be used during the periods when the sun isn't shining or the wind isn't blowing. An array of FES units may also supplement the power grid by storing energy at night when demand is low, then augmenting the grid during peak demand.

The kinetic energy stored in an FES is typically harvested using a dynamo, which converts the stored kinetic energy into electricity. The flywheel will slow down as kinetic energy is extracted, and replenished when external energy becomes available. The cycle continues in renewable fashion.

Friction is the greatest impediment to the efficacy of FES. A flywheel spun up to speed will slow down over time as friction slowly bleeds kinetic energy from the system. The bearings that support the flywheel are the main source of friction. To a lesser extent, friction from air resistance will slow the flywheel, but this is easily overcome by placing the flywheel in a vacuum. Because friction within the bearings is a function of force, most FES systems support the axial weight of the flywheel magnetically. A typical configuration uses permanent magnets balanced with electromagnets, as described above. Electromagnets require power, however, and are not an optimal solution. Radial forces are typically stabilized with mechanical centering bearings. Ceramic bearings are popular for this purpose as they are more durable, lighter in weight, and do not require lubrication.

The amount of energy stored in a flywheel depends on the mass, velocity, and shape of the flywheel. The simple formula for kinetic energy is $E=\frac{1}{2}mv^2$, so doubling the mass doubles the kinetic energy, but doubling the velocity quadruples the kinetic energy. For this reason, commercially available FES devices spin at tens of thousands of rotations per minute. These high angular velocities can be dangerous so flywheels are generally placed within a reinforced container, and the flywheels are made of composite materials that can withstand high force. Shape also plays a role, and more energy is stored when the mass of the flywheel is distributed farthest from the axis of rotation. For this reason, the ideal flywheel is barrel-shaped and open in the center rather than the same mass distributed in the shape of a solid cylinder.

SUMMARY OF THE DISCLOSURE

The disclosed system features the Halbach Motor and Generator (HMG) with Rolling Biphasic Coil Control (RBCC), a novel Continuously Variable Magnetic Induction Transmission (VMT) for variable torque transfer, and a reluctance magnetic levitation system known as the Axial-Loading Magnetic Reluctance Device (AMR).

The HMG comprises a pair of coaxial Halbach cylinders, double-nested one within the other. The outer cylinder or rotor is configured to direct magnetic flux inwardly towards the inner cylinder or inner rotor. Likewise, the inner cylinder is configured the direct flux outwardly towards the outer cylinder or outer rotor. The cylinders thus magnetically couple at multiple points or nodes so that adjacent nodes alternate in polarity. The magnetic coupling binds the cylinders together so that torque applied to one is transferred magnetically to the other.

One of these cylinders, say the outer cylinder, is enveloped in a hollow toroid-shaped series of contiguous coils that allow for free rotation of the outer cylinder within the coils. Alternating electric current applied to the coils induces movement of the outer cylinder. The inner cylinder is magnetically coupled to the outer cylinder, so torque generated by the outer cylinder is transferred to the inner cylinder. This urges both cylinders to rotate in tandem at the same rotational rate. The principal of operation would be the same if the inner cylinder surrounded by coils instead of the outer cylinder.

In order to fully understand the operation of the Halbach Motor and Generator we must illuminate the behavior of a magnet versus an iron plunger within an energized coil or solenoid. Consider first an iron plunger in a solenoid coil. Regardless of the direction of current within the coil, the plunger will always be drawn into the coil when the coil is energized. A magnet inside an energized coil behaves differently. When current flows in one direction through the coil, the magnet is drawn inward. When current is made to flow in the opposite direction, the magnet is repelled outward. The optimal force on the magnet, either attraction or repulsion, occurs when the center of the magnet straddles the lip of the coil. The electromotive force is at a minimum when the center of the magnet aligns with the center of the coil. In fact, when the magnet is centered within the coil it experiences no force whatsoever regardless of how the coil is energized.

To emphasize, when the magnet is in the center an energized coil, it experiences zero electromotive force. The force increases progressively as the magnet moves away from the center of the coil, and the force is at a maximum when the center of the magnet straddles the lip or entrance of the coil. The force falls off as the magnet exits the coil. Depending on the direction of current through the coil, the magnet will either be attracted to the center of the coil or repelled away from the center of the coil.

The HMG comprises a series of adjacent contiguous alternating coils in the shape of a circle or toroid. The rotor rotates inside the donut-shaped tunnel created by the circular arrangement of contiguous coils. This ring or cylinder-shaped rotor comprises a Halbach cylinder of alternating circumferential and radial-directed magnets in a repeating pattern. The pattern is formed when magnetic north of one magnet in the rotor is rotated 90 degrees compared to its neighbors on either side. The arc length of this repeating pattern is substantially the same as the length of a coil. The centers of nearest neighboring circumferential-directed rotor magnets will all align with corresponding borders between adjacent coils. Since the direction of coil current is opposite in neighboring coils, the rotor magnets will be simultaneously repelled from one coil while being attracted into the next.

Maximum force occurs when a circumferential magnet straddles the border between two coils, and the electromotive force falls to zero again as the circumferential magnet arrives at the center of the next coil. Thus the torque felt by the rotor is pulsatile as the rotor rotates through the coils, oscillating between zero and a maximum. The motor is vulnerable to stalling when the torque falls to zero unless a flywheel is employed.

Rolling Biphasic Coil Control (RBCC) represents a method to overcome the issue of mid-phase stalling for applications in which a flywheel is not feasible. RBCC is a configuration that provides continuous torque. At no point in rotor rotation does the torque on the rotor fall to zero. In order to achieve this objective, each coil is subdivided into coil increments. Contiguous coil increments are grouped so that each coil group is equal in length to the original coil. The greater the number of coil increments within a group the closer the average torque approaches 100%. The coil increments in a given group are energized in the same direction, and adjacent groups are energized in the opposite direction.

When the midpoint of a rotor magnet straddles the border between two adjacent coil groups, the electromotive force on the magnet is at a maximum. As the rotor rotates, the magnet will begin to move away from this optimal position straddling two coil groups. At this point, a change occurs in the coil groupings. A position sensor detects when the rotor has rotated a distance equal to one coil increment and sends this information to the RBCC motor controller. The motor controller then reconfigures the coil groupings. The number of incremental coils in a group remains the same, but the new coil groups are configured so that each rotor magnet straddles the border between two new coil groups. Effectively, the motor controller shifts the border between coil groups in order to maintain the rotor magnet in a position of optimal electromotive force. RBCC prevents the torque from ever dropping to zero, thus eliminating mid-phase motor stall.

The circular alternating magnetic fields generated by the toroidal configuration of coils produces a beneficial stabilizing effect on the magnetic rotor. The most stable rotational path for the rotor is circular and through the center of each coil. If the rotor deviates from this stable circular path, electromagnetic forces nudge the rotor back to this stable path. Above a threshold rotational rate, the toroid stator effectively levitates the rotor. In an evacuated chamber, the rotor rotates free of friction. Torque is transferred magnetically from this levitating outer rotor to the inner rotor, which is connected to a drive shaft.

In an alternate configuration, the double-rotor is surrounded by a by a double-toroid. Both the inner and outer rotors are each surrounded by a hollow toroid-shaped series of contiguous alternating coils surround. The inner and outer toroids are nested one within the other, and attached via a base plate so that there is a thin cylindrical gap separating the two. The coils of the inner and outer toroids are configured to urge the inner and outer rotors at the same rotational rate, thus preserving the magnetic coupling between the rotors. Above a threshold rotational rate, each rotor is levitated within its respective toroid-shaped series of coils. And since each rotor is levitated by its own set of coils, both rotors now rotate free of friction when placed within an evacuated vessel. In this embodiment, a controller energizes the coils of the inner and outer toroids so that the rotational rate of the inner rotor matches the rotational rate of the outer rotor.

Since the inner and the outer rotors are magnetically coupled across a gap, a novel method of torque transfer becomes possible. This method employs magnetic induction, and functions regardless of whether one or the other rotors is enveloped in coils. The magnetic coupling between rotors occurs at discreet nodes of increased magnetic flux within the gap between the rotors. These nodes alternate N/S in magnetic polarity. When the coils are energized, the rotors will rotate, as well as the magnetic flux nodes that couple the rotors together. A metal conductor inserted into this rotating magnetic field will generate torque according to Lenz's Law.

A rotatable cylinder, hereafter called an induction cylinder, composed of a conducting material such as copper or aluminum, lowered into the gap between the inner and outer rotors will directly experience the alternating N/S magnetic flux nodes. By Lenz's Law, movement of the magnetic fields within the gap will induce a circular electric current in the induction cylinder. This induced current will give rise to a magnetic field of its own. This causes the induction cylinder to rotate in the same direction as the rotors. Importantly, the reverse is also true. Rotating the induction cylinder within the gap between the inner and outer magnetic rotors will induce the HMG rotors to move within the toroid coils, thereby generating electricity. Torque transfer by magnetic induction is at the heart of the Continuously Variable Magnetic Induction Transmission (CVMIT).

The degree to which torque is transferred between the HMG and the induction cylinder depends on several factors. These factors include the rotational rate, the strength of the magnetic fields between the rotors, the conductivity of the induction cylinder, and the mass of the conductor. Copper is an excellent conductor and will affect high torque transfer. Titanium (a poor conductor) will affect a lesser torque transfer. For cost considerations, aluminum might be sufficient, or perhaps an alloy of copper. Also, a thicker-walled induction cylinder will effect greater torque transfer than a thin-walled cylinder.

The CVMIT serves as a mechanical clutch, allow for the smooth transmission of mechanical power between the induction cylinder and the HMG. However, there can never be 100% torque transfer in a magnetic induction system because there must be relative movement between the inductor and the magnetic field. At sufficiently high rotational rates the torque transfer approaches 100%. Another way to describe the phenomenon is to state that there will always be slippage in the torque transfer between rotors and induction cylinder. Slippage is at a minimum when the rotational rates are highest. Unlike mechanical slippage between clutch plates, magnetic induction slippage does not generate excessive heat.

The CVMIT allows the user to control the rate of torque transfer by controlling the depth to which the induction cylinder enters into the gap between the rotors of the HMG. Varying the depth of insertion also varies the degree of slippage, with greater depth resulting in lesser slippage. The greater the depth of insertion the greater the exposure of the inductor to the rotor magnetic fields, and the more torque is transferred. Greater torque means faster rotor speed.

In one embodiment, the induction cylinder is attached operationally to the flywheel, and the HMG is attached to a movable platform. This platform is equipped with some means of moving the HMG in increments such as a hydraulic lift, worm screw lift, screw lift, servomotor, etc., capable of raising or lowering the HMG so as to variably engage the induction cylinder. Kinetic energy is thus transferred from the flywheel to the induction cylinder. The induction cylinder engages the HMG to convert kinetic energy to electric energy. Varying the degree of engagement between the induction cylinder and the HMG rotors may control how much electric energy is produced.

Here is an example: If a small amount of power is required, a servo motor attached to the induction cylinder inserts the cylinder part way into the gap between the rotors of the HMG. This partial insertion extracts a smaller amount of energy than full insertion because less conductor is exposed to the alternating magnetic fields. When more energy is required, the servo unit introduces the induction cylinder to a greater depth, exposing more conductor to the alternating magnetic fields.

The CVMIT may operate as the primary means of torque transfer, or as a secondary means of torque transfer. As described previously, when both HMG rotors are enveloped in coils, the CVMIT provides a primary contactless means of transferring torque. In a second embodiment, the CVMIT provides for secondary torque transfer while the primary means of torque transfer is magnetic. Torque is transferred primarily from the stator/rotor to a magnetically coupled second rotor that is attached to a shaft. The coupled rotors rotate at the same rate so torque transfer is 100%. In this second embodiment, the CVMIT may act as a secondary or supplemental means of torque transfer. The induction cylinder inserted into the air gap between the rotors will experience the magnetic field between the rotors, and will therefore experience a torque as previously described. This secondary means of torque transfer may be used for supplemental systems requiring variable torque transfer. If the HMG is employed within a vehicle motor, the primary magnetic power train might be employed to propel the vehicle forward while the CVMIT is employed to operate secondary systems . . . an AC compressor, for example.

The HMG may function as a dynamo to generate electricity. Coupling the HMG dynamo with the CVMIT provides a variable means of electric power generation. The CVMIT induction cylinder may be inserted into the gap between the HMG rotors, resulting in torque transfer from the induction cylinder to the rotors. This results in rotor rotation through the stator coils which in turn generates electricity. The CVMIT induction cylinder may be inserted to various depths commensurate with the electric power demands of the moment. The greater the depth of insertion the more torque transferred from the induction cylinder to the HMG rotors, resulting in greater electrical power generation.

System control is achieved with an IC controller having a position sensor and a power meter. The controller signals some means of incremental insertion, such as a screw lift with a servo motor, power hydraulic system, linear actuator, etc., capable of inserting the induction cylinder to various depths corresponding to the power needs of the moment. The power meter provides feedback to the controller, which adjusts the depth accordingly. If more electrical power is needed, the IC inserts the CVMIT induction cylinder to a greater depth, and the HMG generates more power. If less power is needed, the IC withdraws the CVMIT induction cylinder resulting in less electrical power generation by the HMG.

The disclosed technology also employs the Axial-Loading Magnetic Reluctance Device, or AMR device, which is a type of passive magnetic thrust bearing. This is a permanent magnet thrust bearing and thus requires no energy input. The AMR comprises a circular or ring magnet attached to a shaft such that the shaft passes through the center of the magnet which extends at right angles away from the shaft. The N/S poles of the circular magnet extend parallel to the shaft. Alternatively, the circular magnet may be contained within a hollow tube attached at the outer edge of a ring magnet.

A plurality of magnet arrays surround the shaft such that each magnet array couples with the circular magnet. The magnet arrays attach to a base and comprise one or more magnets configured so that the N/S poles of each array extend largely parallel to one another towards the shaft, and at right angles to the N/S poles of the circular magnet. The north pole of each magnet array couples to the south pole of the circular magnet while the south pole of each magnet array couples to the north pole of the circular magnet. Thus each magnet array forms a magnetic circuit with the circular magnet.

The AMR employs reluctance magnetic forces that arise from this magnetic circuit, and enable levitation of an axial load. The magnet forces associated with reluctance behave quite differently than the usual magnetic attractive force, owing to the unique properties of a magnetic circuit. A magnetic circuit may comprise magnets and ferromagnetic components (think iron or steel) arranged in such a way that magnetic flux may travel in a closed loop through each component. Flux through the magnetic circuit is strongest, and magnetic reluctance is at a minimum, when the component magnets and ferromagnetic elements are physically closest together, and air gaps between the components are small. A force is required to remove a component from the circuit; one could say the circuit is "reluctant" to lose one of its components. Moving a component magnet a small distance away from the circuit only disrupts the magnetic flux a bit, and thus only a requires a small force. The required force increases, however, the farther the component magnet is moved from away from the circuit. In other words, if one were to physically pull a component magnet away from the circuit, it would initially be easy and then progressively harder up to the point where the magnet breaks free.

Reluctance magnetic forces arising from a magnetic circuit behave quite differently than the force of magnetic attraction. The force required to separate two magnets that are attracted to each other is initially high, and then falls off with the inverse square of the distance between the attracted magnets. In contrast, the force required to remove a magnet from a magnetic circuit is initially low, then increases the farther the magnet is from the magnetic circuit. The force-displacement curve is similar to a spring scale. A light force displaces the spring a small amount, heavier forces displace the scale by a larger amount. A rubber band behaves the same way. The force required to stretch a thick rubber band is initially small but increases the more one stretches the rubber band (until the rubber band breaks).

Reluctance magnetism is initially counterintuitive, and not frequently employed. The AMR is the first of its kind. But his phenomenon confers a huge benefit to an FES device by enabling magnetic levitation without electric power. Electric power requirement works against the goal of FES, which is to store energy.

The disclosed FES system may employ the HMG for energy input and/or output. Electrical energy may be supplied to the HMG motor attached to the flywheel shaft to increase the kinetic energy of the FES system. For energy output, the HMG motor functions in reverse as a generator (dynamo) to convert kinetic energy from the flywheel back into electric energy.

Hybrid systems are also possible, combining one means of energy input and another means for energy extraction. Energy input to the FES might be achieved using an off the shelf solar, wind, or grid-powered electric motor, direct input from a rotating windmill, direct input from a rotating water turbine, etc. The HMG might be used in this system as a dynamo for energy output.

BRIEF DESCRIPTION OF THE DRAWINGS

FIGS. 5A-5C is a sectional schematic depicting rotor rotation and adjacent coils energized opposite one anther;

FIGS. 6A-6C is a sectional schematic similar to FIGS. 5A-5C but with each coil divided into 3 smaller, incremental coils;

DETAILED DESCRIPTION OF THE INVENTION

Figure 1:
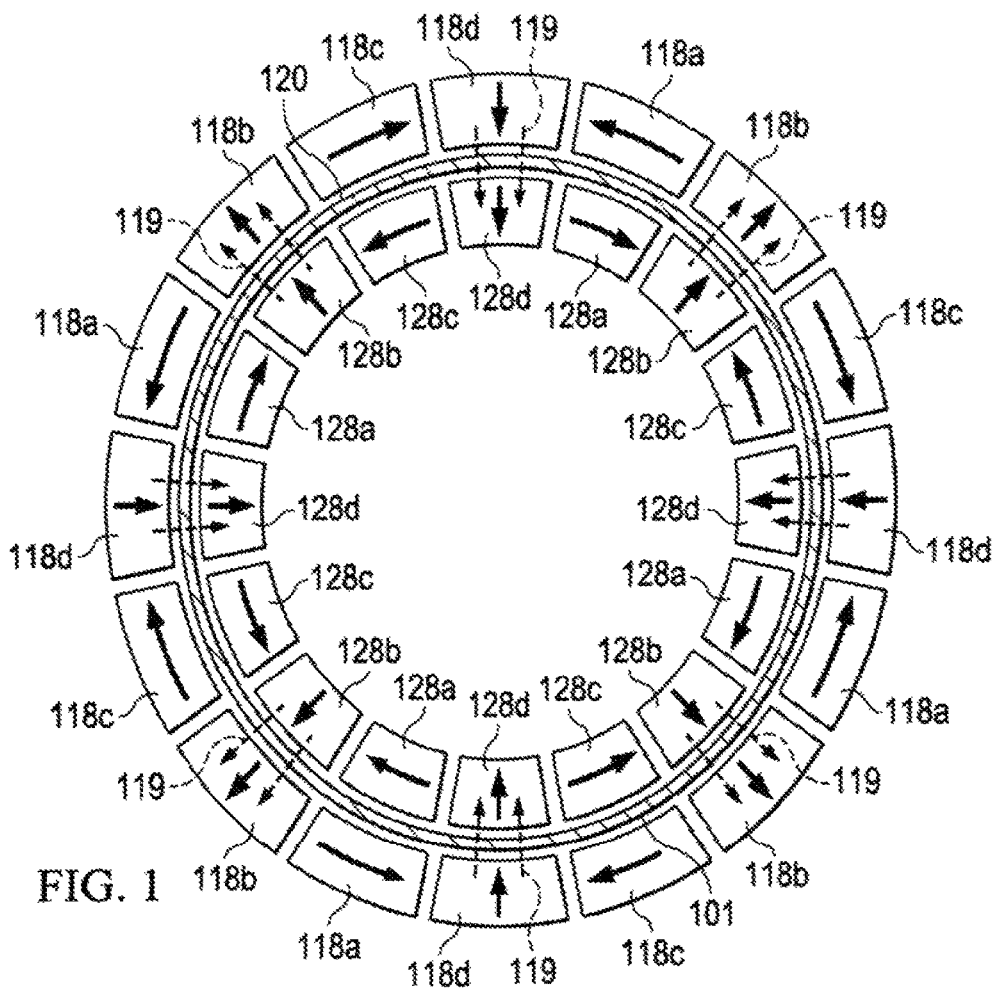
FIG. 1 is a schematic diagram exemplifying coaxial-coupled magnet cylinders and an induction cylinder in accordance with principles of the present invention.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as magnets, electromagnets, controllers, and the like necessary for the operation of many electrical devices, have not been shown or discussed in detail inasmuch as such details are not considered necessary to obtain a complete understanding of the present invention, and are considered to be within the skills of persons of ordinary skill in the relevant art.

In addition, as used herein, the term "substantially" is to be construed as a term of approximation. The term "N/S polarity" used with respect to a drawing, means a counter-clockwise end of a magnet or coil has a North polarity, and a clockwise end of a magnet or coil has a South polarity. Conversely, the term "N/S polarity" used with respect to a drawing, means a counter-clockwise end of a magnet or coil has a South polarity, and a clockwise end of a magnet or coil has a North polarity Referring to FIG. 1 of the drawings, the reference numeral 100 generally designates a system of magnets arranged in circular Halbach arrays, also referred to as "rotors," embodying features of the present invention. More specifically, the system 100 comprises an outer magnet array designated by the reference numeral 118 with a letter appended to it, which outer magnet array 118 is magnetically coupled to an inner magnet array designated by the reference number 128 with a letter appended to it. The magnetic coupling occurs at various points around each array as exemplified by magnetic flux lines 119. Magnetic coupling between the inner and outer arrays of magnets results in a transfer of torque between the inner and outer arrays of magnets. Accordingly, when one array 118 or 128 is urged to rotate, the other array also rotates as the arrays are magnetically coupled, as disclosed in the Halbach Motor and Generator, U.S. Pat. No. 9,876,407.

An induction cylinder 120 is interposed between arrays 118 and 128. Induction cylinder 120 is fabricated from an electrically conductive material, such as copper or aluminum. When induction cylinder 120 is at rest relative to the coupled magnet cylinders 118 and 128, no force exists on the induction cylinder 120. Movement of induction cylinder 120 relative to coupled magnet cylinders 118 and 128 generates an electrical current within induction cylinder 120, in accordance with Faraday's law of induction. The electrical current, contained completely within the conductor, induces a magnetic field of its own. The induced magnetic field contained within the induction cylinder 120 results in an electromotive force, and torque transfer, between the induction cylinder 120 and the coupled magnet arrays 118 and 128.

The outer rotor 118 and the inner rotor 128 are also referred to as a pair of double-nested coaxial Halbach cylinders, well-known to those skilled in the art. It should be understood, however, that the scope of the disclosed invention is not limited to the Halbach cylinder, and is meant to include any configuration of one or more coaxial magnet arrays that are coupled so as to create magnetic field lines that pass through an induction cylinder fabricated from conducting material.

It should be apparent to one skilled in the art that the function of the magnetic arrays 118 and/or 128 is to generate a magnetic field that produces a force when proximate to an induction cylinder of conducting material as per Faraday's law. Strictly speaking, either the outer rotor 118 or the inner rotor 128 would alone be sufficient to transfer torque to induction cylinder 120 across a small enough gap if the magnetic fields were sufficiently strong.

Figure 2:
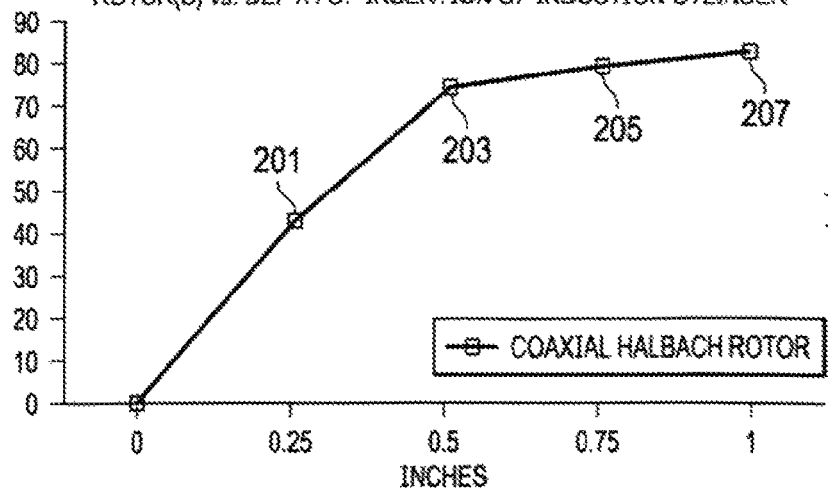
FIG. 2 is a graph of experimental data showing the portion of torque transferred in one exemplary embodiment of the present invention.
Figure 3A:
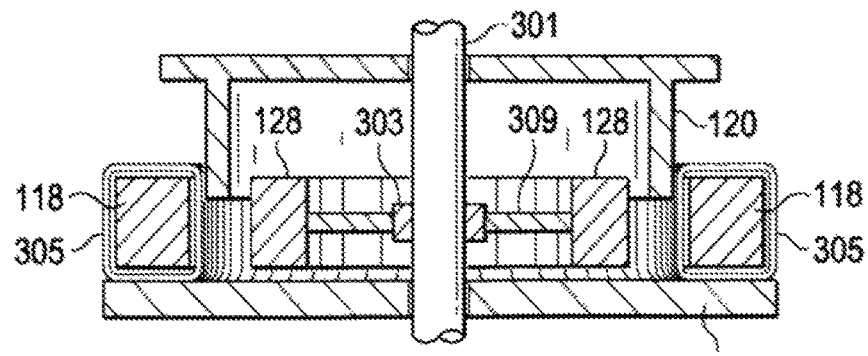
FIGS. 3A-3D are cross-sections of the embodiment of FIG. 1, showing progressive penetration of the induction cylinder into the gap between magnet cylinders.
Figure 3B:
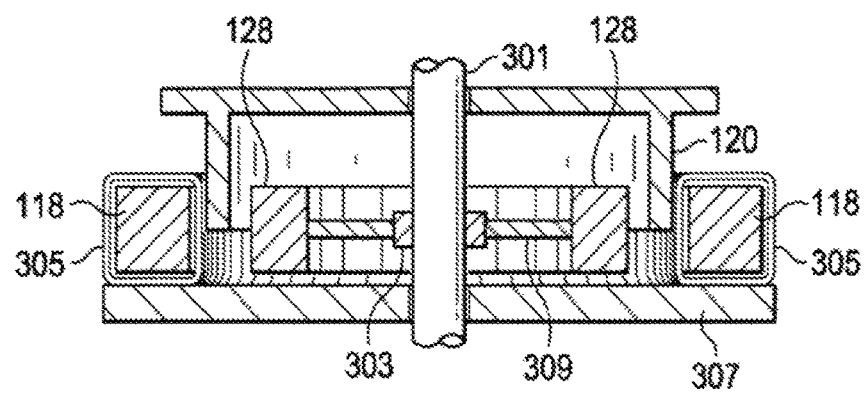
Figure 3C:
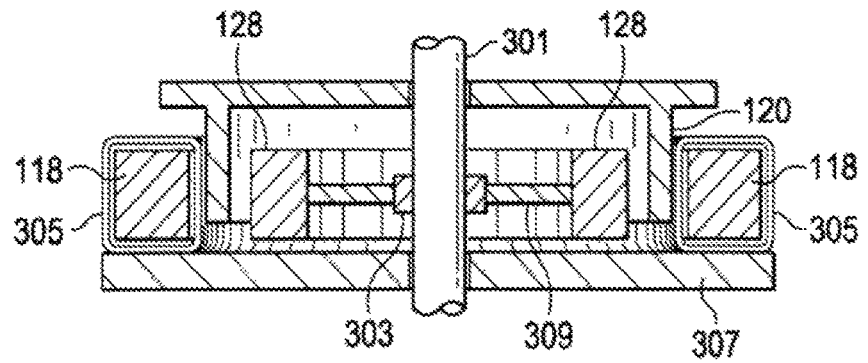
Figure 3D:
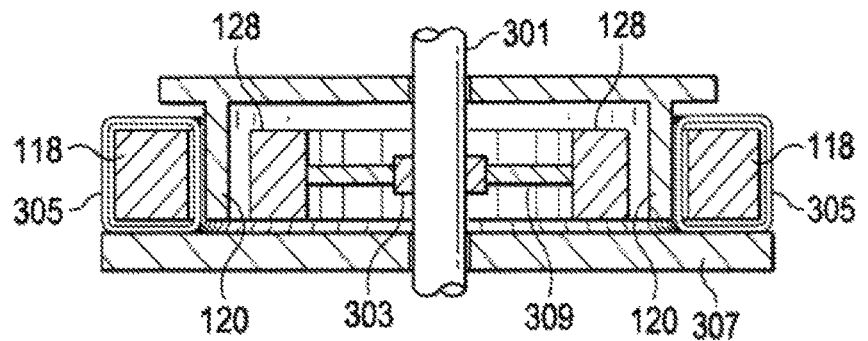

With reference to FIGS. 2-3D, experimentation has shown that when the magnet rotors 118 and 128 are rotated (e.g., at 3,240 RPM per FIG. 2), torque is transferred from magnet rotors 118 and 128 to induction cylinder 120. The degree of torque transferred depends upon the degree to which induction cylinder 120 is lowered into a gap defined between outer magnet rotor 118 and inner magnet rotor 128, the gap having a depth "d". Induction cylinder 120 has a height preferably sufficient to enter the full depth d of the gap, and is attached to rotatable shaft 301. FIG. 3A shows induction cylinder 120 penetrating the gap by 0.25 d. At this depth, about 40% of torque from magnet rotors 118 and 128 is transferred to induction cylinder 120, as indicated by data point 201 on FIG. 2. When induction cylinder 120 is lowered in the gap to a depth of 0.50 d, as shown in FIG. 3B, the transfer of torque increases to over 70%, as per data point 203 on FIG. 2. When induction cylinder 120 is lowered in the gap to a depth of 0.75 d, as shown in FIG. 3C, the transfer of torque increases to over 80% as per data point 205 on FIG. 2. When induction cylinder 120 is lowered in the gap to a full depth of d, as shown in FIG. 3D, the transfer of torque increases to over 80% as per data point 207 on FIG. 2.

Energizing coil 305 will urge outer magnet rotor 118 to rotate which causes inner magnet rotor 128 to rotate in tandem. Magnet rotor 118 is coupled to magnet rotor 128 across multiple nodes of magnetic flux that pass through induction cylinder 120, and so by the principles of Faradays law as described above, the movement of the magnet cylinders 118 and 128 induces movement of induction cylinder 120.

It should be noted that flywheel energy storage devices routinely operate in the tens of thousands of RPM's. The intention of FIG. 2 is to demonstrate that even at relatively low RPM's there is a high degree of torque transfer.

Figure 4B:
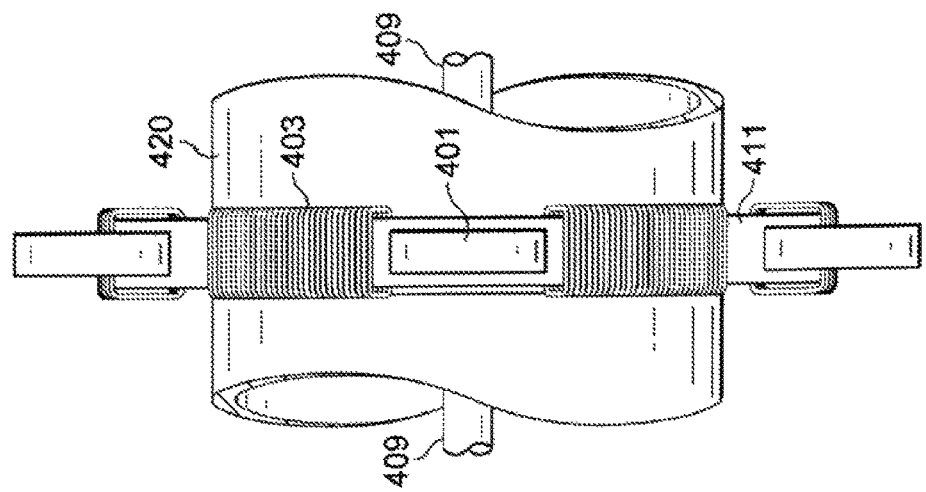
FIGS. 4A-4B are frontal and side illustrations of an embodiment having multiple wheel bearings that center a magnet rotor between coils.
Figure 4A:
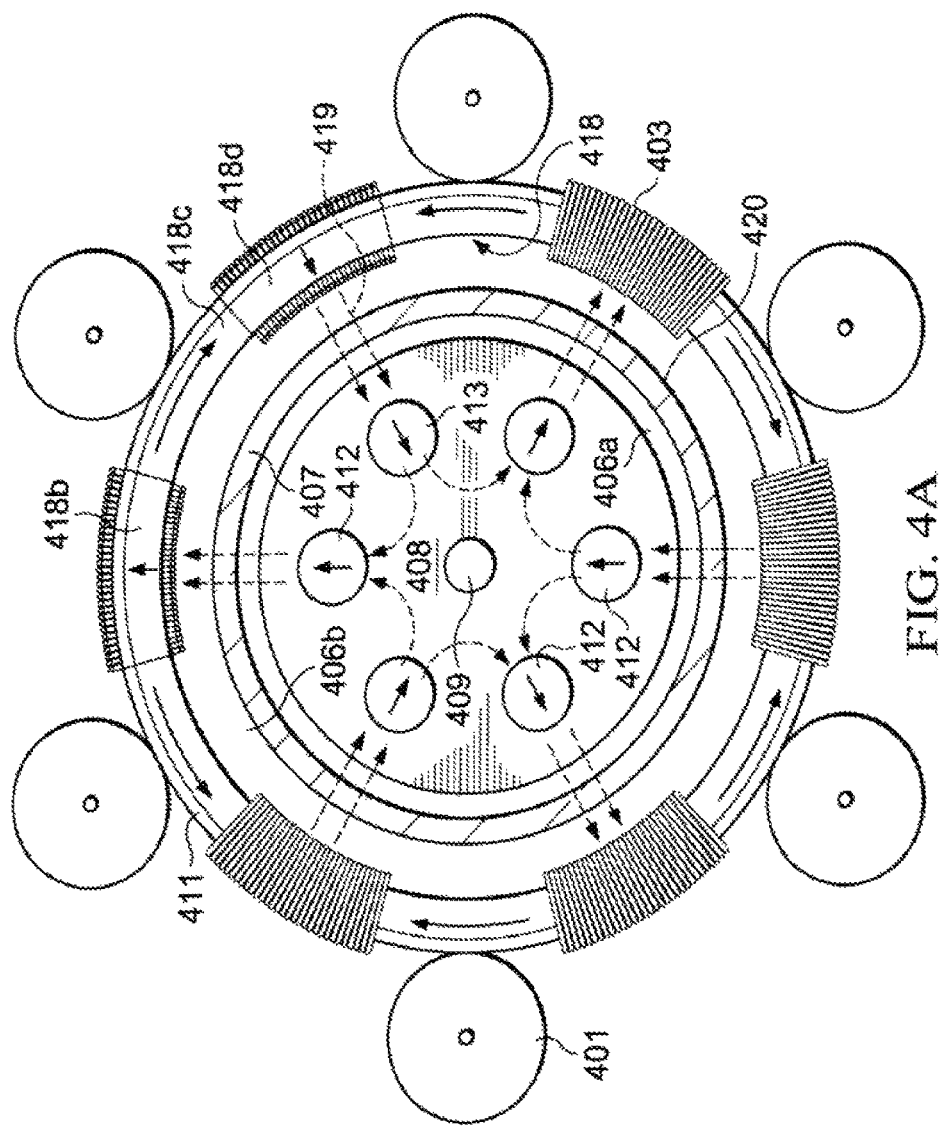

FIG. 4A illustrates an alternate preferred embodiment in which an outer magnet rotor 418 comprises a Halbach cylinder that is coupled to an inner rotor assembly 408 comprising alternating magnets 412 and 413. This configuration generates periodic and alternating magnetic flux lines 419, which are nodes of high magnetic flux density. Magnetic flux lines 419 pass through induction cylinder 420. This embodiment demonstrates that magnetic coupling and torque transfer may occur between a variety of coaxial magnetic arrays, and that cylinders need not be configured as Halbach cylinders. Although the magnets 412 and 413 within inner rotor assembly 408 alternate in polarity, this alternation is not absolutely necessary. Any configuration of magnets within the inner or outer rotor that results in magnetic flux passing through the induction cylinder 420 will function to some degree in accordance with Faraday's law of induction.

Outer magnet rotor 418 is surrounded by a plurality of outer rotor supports 411 which provide structural support to magnet cylinder 418. Outer rotor support 411 also provides a bearing surface for wheel bearings 401 which serve to center outer magnet rotor 418 as it rotates with a plurality of coils designated 403. Energizing coils 403 urge rotation of outer magnet rotor 418 which is coupled to inner rotor assembly 408 which rotates about shaft 409. Torque is thereby transferred from outer magnet rotor 418 to inner rotor assembly 408 across flux lines 419 which pass through induction cylinder 420.

The embodiment of FIGS. 4A and 4B thus illustrates two possible modes of torque transfer from outer magnet rotor 418. Direct or primary torque transfer occurs as a result of the magnetic coupling between outer magnet rotor 418 and inner rotor assembly 408. This torque is transferred directly to drive shaft 409.

Secondary torque transfer may also occur simultaneously as a result of the induced electromotive forces resulting from the effect of magnetic field lines 419 upon induction cylinder 420 in accordance with Faraday's law of induction. Both modes of torque may occur within the same motor/generator configuration.

By way of example, but not limitation, see FIGS. 5A-5C. If the stationary position of the outer magnet rotor 518 is as shown in FIG. 5A, and electric current is applied to induce the North/South (N/S) polarities of the coils 503 shown in FIG. 5A, then the motor will start and rotate in a clockwise direction, as indicated by direction arrow 502. This movement is achieved as a result of the opposite polarities of coils 501 and 503, relative to the position of magnet 518c. Note that the N/S polarity of coil 501 is opposite that of magnet 518c. This results in an electromotive force that repels magnet 518c out of coil 501 in a clockwise direction. Simultaneously, magnet 518c is attracted into coil 503 because the N/S polarity of coil 503 is the same as the N/S polarity of magnet 518c, again with a resultant clockwise rotation.

Once the motor has started turning, the polarity of the coils is reversed when coupled magnets 518b and 528b transition from coil 501, as shown in FIG. 5B, and into an adjacent coil 503, as shown in FIG. 5C. The reversal of coil polarity enables continued clockwise rotation of outer magnet rotor 518, and this process continues whenever radial magnets 518b and 528b transition from one coil into the next.

The electromotive force felt by magnet 518c, having a center designated by dashed line 504, is at a maximum when magnet center 504 passes between coils 501 and 503 as shown in FIG. 5A. As magnet center 504 approaches the midpoint of coil 503, as shown in FIG. 5B, the electromotive force on magnet 518c falls to zero, and the polarities of coils 501 and 503 are reversed, as shown in FIG. 5C. Then, as magnet center 504 rotates beyond the midpoint of coil 503, as shown in FIG. 5C, the clockwise electromotive force or torque felt by 518c steadily increases. Thus, as outer magnet rotor 518 rotates, the torque exerted by coils 501 and 503 upon the magnet rotors 518 and 528 will oscillate between zero and some predetermined maximum in sinusoidal fashion as alternating current is applied to the coils. It may be beneficial in some applications to attach a flywheel so as to smooth the resultant torque ripple.

Another means of smoothing torque ripple is illustrated in FIG. 6A, wherein coils 501 and 503 have each been subdivided into three equal coil increments for the application of three-phase alternating current. As is well known to those skilled in the art, each of the three circuits is offset by one-third of a period, or 120 degrees. Coils 501a and 503a are configured on the same circuit, wound in opposite direction, therefore opposite sign. Coils 501b and 503b are configured on a second circuit, wound in opposite direction, therefore having opposite sign. Coils 501c and 503c are configured on a third circuit, wound in opposite direction, therefore opposite sign. This three-phase configuration creates a revolving magnetic field that does not require auxiliary mechanisms to initiate rotation from a dead stop, and could be arranged in a delta or wye circuit. Torque ripple would be further mitigated by overlapping the windings of adjacent coil increments. While coils 501 and 503 have been exemplified as divided into three equal coil increments, it is understood that coils 501 and 503 could be divided into any number of equal coil increments as desired and still operate in accordance with principles of the present invention.

FIGS. 6A-6C, wherein coils 501 and 503 have each been subdivided into three equal coil increments, also illustrates the rolling biphasic configuration. As discussed above with respect to the embodiment of FIG. 5, the maximum electromotive force occurs when magnet center 504 is between adjacent coils, and that this force falls to zero as magnet center 504 approaches the midpoint of a coil. The rolling biphasic configuration subdivides coils 501 and 503 into three equal increments each, designated 501a-501c and 503a-503c respectively. A coil group comprises three adjacent coil increments all with the same polarity, such as coil group 611 and coil group 612. A coil group of three adjacent coil increments all having the same polarity behaves substantially the same as a single coil whose length is substantially the same as the sum of the lengths of the adjacent increment coils within a coil group. For example, the electromotive force generated by coil 501 in FIG. 5A is equal to the electromotive force of coil group 611 in FIG. 6A comprising increment coils 501a-501c, provided the increment coils are configured in series. Likewise, the electromotive force generated by coil 503 in FIG. 5A is equal to the electromotive force of coil group 612 in FIG. 6A comprising increment coils 503a-503c, again provided the increment coils are configured in series.

The objective of the rolling biphasic configuration and method is to selectively energize groups of adjacent incremental coils so that magnet centers 504 of respective magnets 518a and 518c will always be at or near the border between two adjacent coil groups, and will thus experience substantially continuous maximal or near-maximal electromotive force.

In FIG. 6A, coil group 611 comprises coil increments 501a-501c, each coil having a N/S polarity, which generates an electromotive force that repels magnet 518c, thereby urging magnet 518c to move in a clockwise motion. Coil group 612 comprises coil increments 503a-503c each having a S/N polarity, which generates an electromotive force that attracts magnet 518c, thereby also urging magnet 518c to move in a clockwise motion. Magnet center 504 runs between coil group 611 and 612, and as such lies in a position of optimal electromotive force. As a result, outer rotor 518 rotates clockwise.

As outer rotor 518 rotates, magnet center 504 rotates away from a point of optimal force between magnets 501c and 503a in FIG. 6A to a new position as shown in FIG. 6B, a point of optimal force between magnets 503a and 503b. A position sensor (not shown) detects this movement causing a controller (not shown) to selectively energize the coil increments in a new configuration so as to restore optimal electromotive force. The new configuration of coil group 611 comprises adjacent coil increments 501b, 501c, and 503a, each having a N/S polarity. Physically, the position of coil increments hasn't changed, only the coil grouping. Magnet 503a switched from having a S/N polarity in FIG. 6A to having a N/S polarity in FIG. 6B. Likewise, coil increment 501a switched from a N/S polarity in FIG. 6A to a S/N polarity in FIG. 6B. The coil increments are selectively energized in a rolling fashion that stays in tandem with the rotating rotor and thus maintains optimal electromotive force. FIG. 6C demonstrates further rotation of outer magnet rotor 518, resulting in a coil configuration that continues to roll forward in tandem. In FIG. 6C, coil group 611 comprises coil increments 501c, 503a, and 503b, all have a N/S polarity. In each of FIGS. 6A, 6B and 6C, the coil increments have been selectively energized in rolling fashion so as to maintain magnet center 504 in a position of optimal electromotive force between adjacent coil groups.

Figure 7:
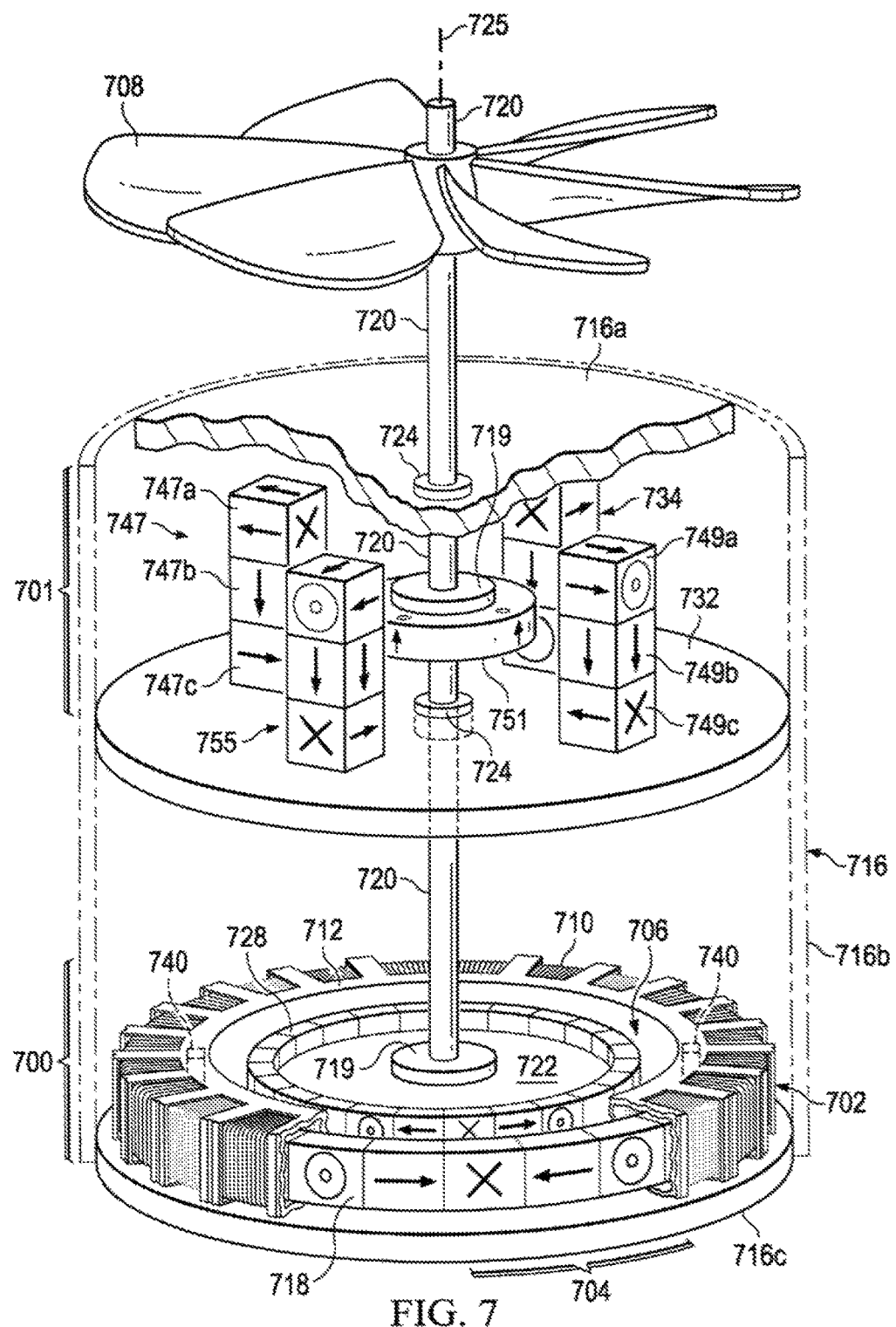
FIG. 7 is an embodiment of the Halbach motor having a magnetic bearing and a propeller.

FIG. 7 exemplifies a further embodiment 702 of the invention effective for providing a rotatory driving force, such as a propeller configured to move fluids such as air or water. The disclosed embodiment comprises Halbach motor assembly 700, a magnetic bearing assembly referred to herein as an Axial-Loading Magnetic Reluctance Device ("AMR") 701, and propeller 708, all operationally connected by rotatable shaft 720 and enclosed by housing 716.

As described in greater detail in U.S. Pat. No. 9,876,407, and US Patent Publication No. US 2015-0115756 A1, published Apr. 30, 2015, (the '756 patent publication) which patent and publication are incorporated herein by reference in their entireties, Halbach motor assembly 700 comprises outer magnet rotor 718 which is positioned for free rotation within an energizing toroidal coil assembly 710 held within a coil frame 712. Outer magnet rotor 718 is attached to housing back plate 716c, and is magnetically coupled to inner magnet rotor 728 which is attached to shaft 720 by shaft support 719. Inner magnet rotor 728 is not attached to housing back plate 716c. Energizing toroidal coil assembly 710 urges outer magnet rotor 718 to rotate, generating torque. This torque is transferred magnetically to inner magnet rotor 728 resulting in the rotation of shaft 720 and rotation of propeller 708.

Radial displacement of shaft 720 is restrained by bearings 724, and axial displacement of shaft 720 is held within a predetermined range by AMR 701. AMR 701 comprises magnet arrays 755, 747, 734, and 749 mounted on plate 732 and surrounding shaft 720 and magnetically coupled to circular or ring magnet 751 mounted to shaft 720. The magnetic coupling between circular or ring magnet 751 and each magnet array forms a reluctance magnetic circuit, as discussed in the '756 patent publication. Reluctance within each circuit increases with increasing axial load on shaft 720 resulting from the rotation of propeller 708. Increasing reluctance generates an axial force equal and opposite the axial force generated by the rotating propeller 708. This maintains shaft 720 within a predetermined axial range, which prevents inner magnetic rotor 728 from being displaced away from Halbach motor 700.

It should be obvious to one skilled in the art that operational principals would remain the same if shaft 720 were replaced by a hollow tube such that the ring magnet would be contained within the tube, attaching at the periphery of the ring. The inner magnet rotor would also be contained within the tube, also attaching at the periphery. Propeller 708 would therefore become an impeller, also contained wholly within the tube and also attaching at the periphery.

Figure 8:
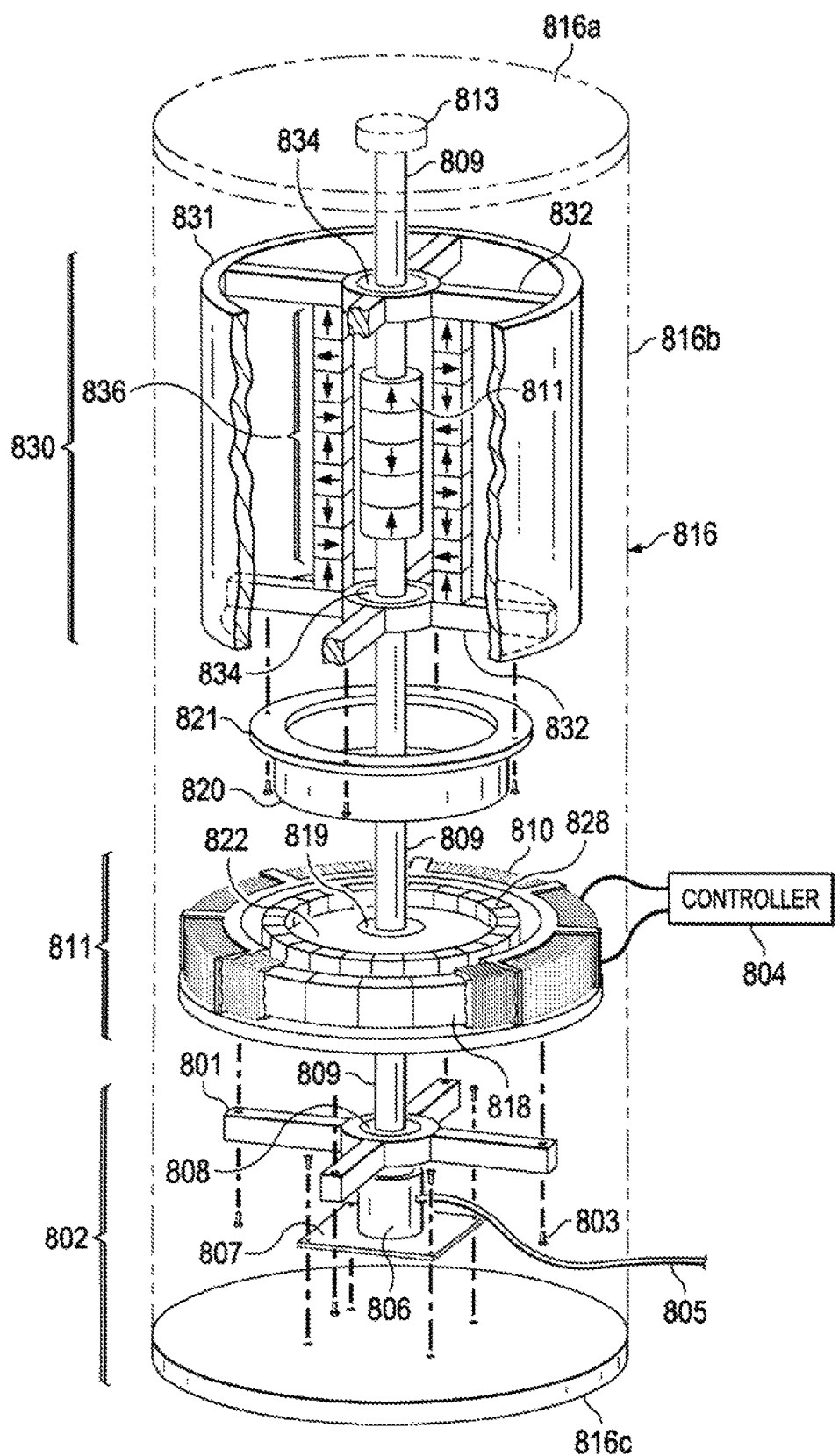
FIG. 8 is an embodiment of the Halbach motor/generator having a magnetic bearing and configured as a flywheel energy storage device.

FIG. 8 shows an embodiment of the Halbach Motor and Generator within a Flywheel Energy Storage System (FES) 800 employing Continuously Variable Magnetic Induction Torque Transmission and Axial Magnetic Reluctance, all contained within housing 816, preferably capable of sustaining low vacuum pressure. Major components include a lift assembly 802, a motor assembly 811, and a flywheel assembly 830, all of which components are coupled together via shaft 809. This FES system functions in three distinct modes: An idle mode, a charging mode, and a discharge mode.

In the charging mode, electrical power supplied to controller 804 activates motor assembly 811, in this case a Halbach motor and generator, similar to the Halbach motor 700 of FIG. 7. This energizes toroidal coil assembly 810, inducing rotation of outer magnet rotor 818. Inner magnet rotor 828 is magnetically coupled to outer magnet rotor 818, and also begins to rotate in tandem. This produces a rotating magnetic field in the gap between the inner and outer rotors. Inner magnet rotor 828 is attached rotatably to bearing 819 so as to allow free rotation about shaft 809. Bearing 819 attaches slidably to shaft 809 in order that the motor assembly 811 may be raised or lowered.

Lift assembly 802 engages, urging hydraulic lift 806 to elevate platform support 801 attached to motor assembly 811. Elevation of the motor assembly 811 exposes induction cylinder 820 to the rotating magnetic field contained within the gap between inner magnet rotor 828 and outer magnet rotor 818. By Faraday's law of induction, a conductor placed in a moving magnetic field results in an electromagnetic force, so the induction cylinder 820 begins to rotate causing the flywheel 831 to rotate. The faster flywheel 831 rotates, the more energy is stored.

In idle mode, the lift assembly retracts and induction cylinder 820 disengages allowing flywheel 831 to rotate freely. The weight of the flywheel assembly is levitated by a passive magnet bearing system referred to herein as an Axial-Loading Magnetic Reluctance Device (AMR) similar to AMR 701 described above, comprising a plurality of magnetic arrays 836, here configured as Halbach series, attached to support members 832 at either end of the magnetic arrays 836. An alternating series of circular magnets 838 are attached fixably to shaft 809 between an upper restraint 813 and a lower restraint 807. Hydraulic lift 806 is hollow and thus allows passage of shaft 809. Circular magnets 838 are magnetized axially and spaced appropriately to align with the antiparallel axial magnets within magnet arrays 836 in order to facilitate completion of a plurality of magnetic circuits between circular magnets 838 and magnet arrays 836. Downward axial displacement of the flywheel assembly 830 as a result of its own mass will increase magnetic reluctance within the aforementioned magnetic circuits, resulting in an equal but opposite levitating force. Air is preferably been removed from housing 816, so the only friction generated occurs at centering bearings 834 located at the top and bottom of flywheel assembly 830. In idle mode, the friction from the centering bearings 824 is substantially the only way energy is lost from the system.

When energy is required, the FES system 800 transitions from a motor to an electric generator. Accordingly, an external force (not shown) applies torque to flywheel assembly 830 to thereby spin flywheel assembly 830 and induction cylinder 820. Initially, the induction cylinder 820 is not engaged. Lift assembly 802 raises motor assembly 811, engaging the spinning induction cylinder 820 into the magnetic field within the gap between inner magnet rotor 828 and outer magnet rotor 818, which causes the inner and outer magnet rotors to begin rotating. This initiates torque transfer from the spinning flywheel 831 to the motor assembly 811. In this embodiment, the motor assembly is the Halbach motor, which also functions as a generator, so when outer magnet rotor 818 spins the Halbach generator produces an electric current. The rate of electric energy production is a function of the rotational rate of the flywheel and the degree of torque transfer as determined by the depth if insertion of induction cylinder 820 into the magnetic field between the inner magnetic rotor 818 and the outer magnetic rotor 828.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for transferring torque, said system comprising:
  a plurality of electric coils arranged in the shape of a toroid and configured so that, upon the application of electric current through the plurality of coils, adjacent coils generate magnetic fields of opposing polarities;
  a primary rotor having a plurality of permanent primary magnets positioned within the plurality of electric coils for passing through the plurality of electric coils and configured as a primary cylinder having a primary magnetic field, said primary magnets comprising circumferentially oriented permanent magnets;
  a secondary rotor mounted coaxially with the primary rotor externally of the plurality of coils and for rotation relative to the plurality of electric coils, the secondary rotor including a plurality of permanent secondary magnets configured as a secondary cylinder having a secondary magnetic field directed toward the primary rotor and configured to magnetically couple with the primary cylinder, and wherein the plurality of permanent primary magnets are configured as a primary cylinder having a primary magnetic field directed toward the secondary rotor and are configured to magnetically couple with the secondary cylinder, to thereby effectuate the transfer of torque from the primary rotor to the secondary rotor;

an induction cylinder positioned between said primary rotor and said secondary rotor, wherein said induction cylinder comprises an electrically conductive material.

2. The system for transferring torque of claim 1, wherein said system for transferring torque comprises a clutch mechanism, wherein said clutch mechanism is configured to move at least one of said induction cylinder and said primary rotor and said secondary rotor between a disengaged position and an engaged position, wherein an engaged position is defined as a position at which said induction cylinder is positioned between said primary rotor and said secondary rotor.

3. The system for transferring torque of claim 2, wherein said clutch mechanism comprises a variable clutch mechanism, wherein said primary rotor and said secondary rotor comprise a gap between said primary rotor and said secondary rotor, said gap defining a length, wherein said variable clutch mechanism is configured to move at least one of said induction cylinder and said combination of said primary rotor and said second rotor between a disengaged position and at least two engaged positions.

4. The system for transferring torque of claim 1, wherein said induction cylinder comprises a drive shaft.

5. The system for transferring torque of claim 1 further comprising a controller, wherein said controller is configured to control the transfer of electricity to said coils.

6. The system for transferring torque of claim 5, wherein said controller is configured to provide AC current to a plurality of coil groups, said groups comprising two or more adjacent coils, said adjacent coils connected in series, such that said coil groups provide a virtual coil such that as said primary rotor spins, said controller selectively energizes each coil group to maintain a center of each circumferential magnet on said primary rotor at or near the border between two adjacent oppositely polarized coil groups.

7. The system for transferring torque of claim 6, wherein said mechanism for conducting electric current comprises a sensor, wherein said sensor is in communication with said controller, wherein said sensor is configured to sense the position of at least one of said primary rotor and said secondary rotor, wherein said controller is configured to provide a controlled quantity of current to said coils to generate continuous torque on said induction cylinder.

8. The system for transferring torque of claim 1, wherein said second rotor comprises a plurality of electric coils arranged in the shape of a toroid and surrounding said plurality of permanent secondary magnets and configured so that, upon the application of electric current through the plurality of coils, adjacent coils generate magnetic fields of opposing polarities.

9. The system for transferring torque of claim 1, wherein said secondary rotor comprises a drive shaft.

10. The system for transferring torque of claim 1, wherein said a mechanism for conducting electric current between the plurality of electric coils and an electric apparatus is configured to conduct three phase alternating electric current.

11. A method for transferring torque, the method comprising steps of:
passing alternating current ("AC") through a plurality of electric coils arranged end-to-end in the shape of a toroid and configured so that, upon the application of the AC through the plurality of coils, adjacent coils generate electromagnetic fields of opposing polarities;
inducing from the electromagnetic fields movement of a plurality of permanent primary magnets through the plurality of electric coils for rotation relative to the plurality of electric coils, the plurality of permanent primary magnets constituting a primary rotor and configured as a primary Halbach cylinder having a primary magnetic field;
transferring torque from the primary rotor to a secondary rotor magnetically coupled to the primary rotor, wherein the secondary rotor is mounted coaxially with the primary rotor externally of the plurality of coils and for rotation relative to the plurality of electric coils, the secondary rotor including a plurality of permanent secondary magnets configured as a secondary Halbach cylinder having a secondary magnetic field directed toward the primary rotor and configured to magnetically couple with the primary Halbach cylinder, and wherein the plurality of permanent primary magnets are configured as a primary Halbach cylinder having a primary magnetic field directed toward the secondary rotor and are configured to magnetically couple with the secondary Halbach cylinder to thereby effectuate the transfer of torque from the primary rotor to the secondary rotor; and
transferring torque from the primary rotor to an induction cylinder, wherein the induction cylinder is mounted coaxially with the primary rotor externally of the plurality of coils and for rotation relative to the plurality of electric coils, the induction cylinder rotating through the primary magnetic field and the secondary magnetic field thereby inducing within the induction cylinder an opposing magnetic field so as to effectuate the transfer of torque from the primary rotor to the induction cylinder.

12. The method of claim 11, wherein said step of positioning an induction cylinder between said primary rotor and said secondary rotor comprises using a clutch mechanism to position said induction cylinder between said primary rotor and said secondary rotor in an engaged position from a disengaged position.

13. The method of claim 12, wherein said step of positioning an induction cylinder between said primary rotor and said secondary rotor comprises using a variable clutch mechanism to position said induction cylinder between said primary rotor and said secondary rotor, wherein said primary rotor and said secondary rotor comprise a gap between said primary rotor and said secondary rotor, said gap defining a length, wherein said variable clutch is configured to move at least one of said induction cylinder and said combination of said primary rotor and said second rotor between a disengaged position and at least two engaged positions wherein in a first engaged position said induction cylinder occupies said gap at a longer length that in said second engaged position.

14. The method of claim 11, wherein said induction cylinder comprises a drive shaft.

15. The method of claim 11, wherein said induction cylinder comprises a flywheel energy storage system.

16. A system for transferring torque, said system comprising:

a plurality of electric coils arranged in the shape of a toroid and configured so that, upon the application of electric current through the plurality of coils, adjacent coils generate magnetic fields of opposing polarities;

a primary rotor having a plurality of permanent primary magnets positioned within the plurality of electric coils for passing through the plurality of electric coils and configured as a primary cylinder having a primary magnetic field, wherein said primary magnets comprising primary circumferential magnets, said primary circumferential magnets comprising a magnet center;

a secondary rotor mounted coaxially with the primary rotor externally of the plurality of coils and for rotation relative to the plurality of electric coils, the secondary rotor including a plurality of permanent secondary magnets configured as a secondary cylinder having a secondary magnetic field directed toward the primary rotor and configured to magnetically couple with the primary cylinder, and wherein the plurality of permanent primary magnets are configured as a primary cylinder having a primary magnetic field directed toward the secondary rotor and are configured to magnetically couple with the secondary cylinder, to thereby effectuate the transfer of torque from the primary rotor to the secondary rotor; and a controller configured for controlling the distribution of electric current to said plurality of electric coils, said controller configured to provide AC current to a plurality of coil groups, said groups comprising two or more adjacent coils, said adjacent coils connected in series such that said coil groups provide a virtual coil such that as said primary rotor spins, said controller selectively energizes each coil group so that the border between adjacent coil groups aligns with said magnet center of each said circumferential magnet on said primary rotor.

17. The system of claim 16, wherein said system for transferring torque comprises a sensor, wherein said sensor is positioned to determine the location of said primary rotor in relation to said plurality of electric coils, wherein said sensor is configured to communication said position of said primary rotor to said controller.

18. The system of claim 16, wherein said rolling biphasic configuration comprises said controller configured to continuously adjusting electric current supplied to said electric coils to selectively energize groups of adjacent coils to produce a rolling biphasic configuration to maintain the magnet center of each primary circumferential magnet at or proximate to the border between two adjacent coils.

19. The system of claim 18, wherein said second rotor comprises a plurality of electric coils arranged in the shape of a toroid and surrounding said plurality of permanent secondary magnets and configured so that, upon the application of electric current through the plurality of coils, adjacent coils generate magnetic fields of opposing polarities.

20. The system of claim 17, wherein said controller is configured for controlling the distribution of electric current to said plurality of electric coils surrounding said permanent secondary magnets in a rolling biphasic configuration.

21. The system of claim 16, wherein said secondary rotor comprises a drive shaft.

22. The system for transferring torque of claim 16, wherein said controller is configured to conduct three phase alternating electric current.

* * * * *